(No Model.)
J. McGWIN.
RETURN STEAM TRAP.
No. 311,507. Patented Feb. 3, 1885.
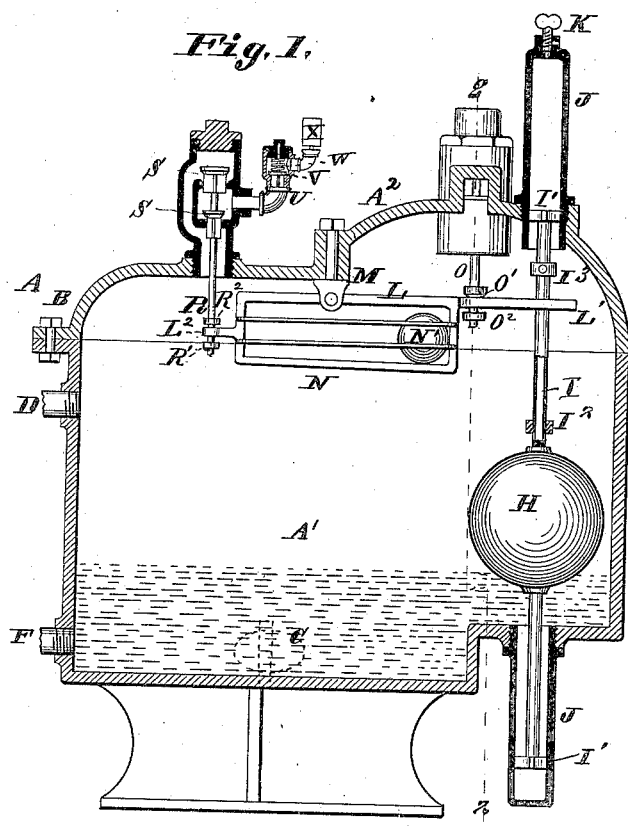
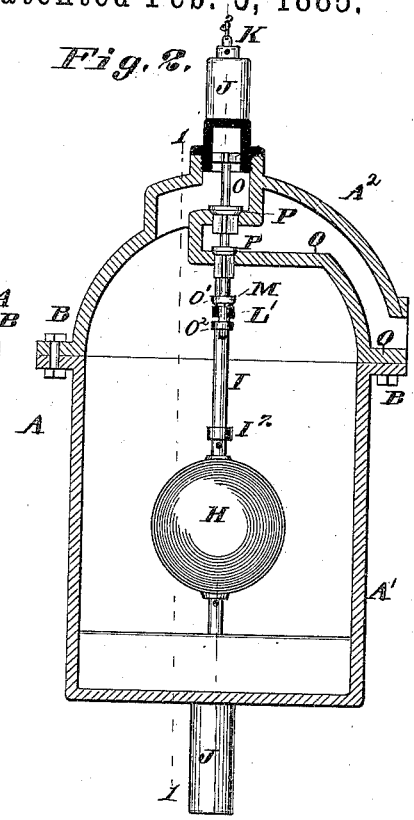
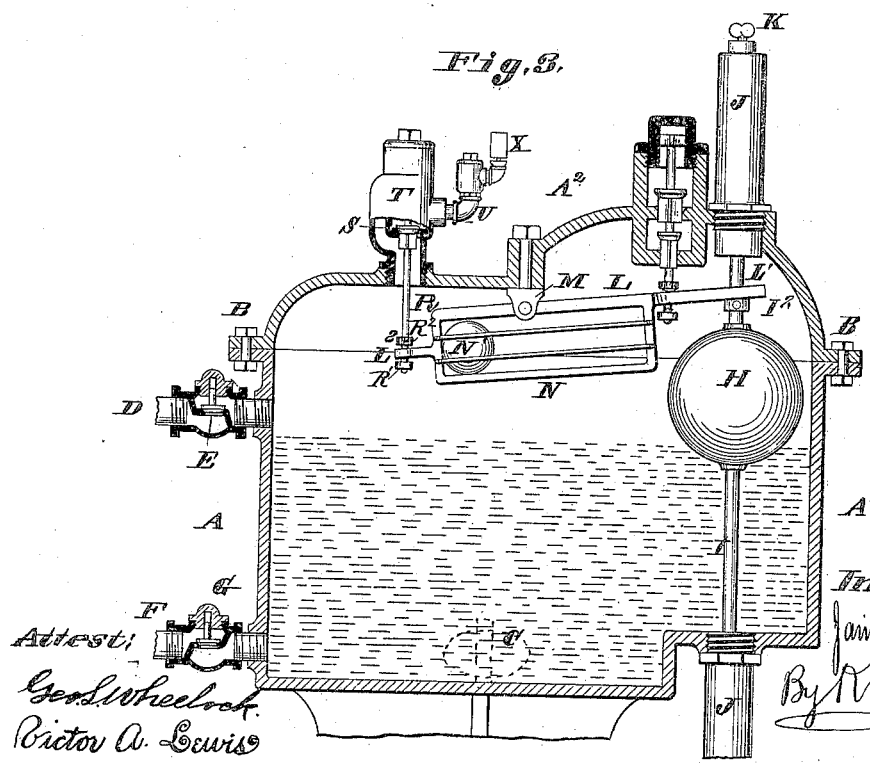
Attest:
Geo. L. Wheelock
Victor A. Lewis
Inventor:
James McGwin
By Knight Bros.
Attys.

UNITED STATES PATENT OFFICE.

JAMES McGWIN, OF FULTON, MISSOURI.

RETURN-STEAM TRAP.

SPECIFICATION forming part of Letters Patent No. 311,507, dated February 3, 1885.

Application filed August 16, 1884. (No model.)

*To all whom it may concern:*

Be it known that I, JAMES McGWIN, of Fulton, in the county of Callaway and State of Missouri, have invented a certain new and useful Improvement in Return-Steam Traps, of which the following is a full, clear, and exact description, reference being had to the accompanying drawings, forming part of this specification.

This is an automatic device for causing the return of the water of condensation from steam-heating coils or pipes to the boiler.

Figure 1 is a vertical section at 1 1, Fig. 2, showing the trap receiving the water of condensation from the heating-coils. Fig. 2 is a vertical section at 2 2, Fig. 1. Fig. 3 is a transverse section at 3 3, Fig. 2, except that the parts are shown in the position for the discharge of water from the trap into the boiler.

The object of my invention is to furnish a small, simple, and cheap trap for laundry drying-rooms and various other places where the amount of pipe to be drained is from six hundred to two thousand feet; also, where small traps can be used to better advantage in large heating apparatuses in connecting the various drain-pipes with them, so as to preserve the proper circulation in heating; also, to furnish a trap which can be taken apart for examination and repairs without disconnecting any of the pipes from the trap and without the use of special steam-fitting tools, or the services of a skilled workman.

A is the body or shell of the trap, which is composed of a base, A', and a top, A$^2$, secured together by a flange-joint with screw-bolts B.

C is a hand-hole through which access may be had to the interior of the trap, the hole being closed by a head, as usual. The water of condensation from the heating-pipes enters the trap through a pipe, D, with a check-valve, E, therein. The water escapes from the trap to the boiler through a pipe, F, which communicates with the interior of the boiler below the water-level. G is a check-valve in pipe F.

H is the float, secured upon a vertical guide-rod, I, whose heads I' work in guide-cylinders J, whose inner ends are open to the interior of the trap. The upper end of the upper guide-cylinder is made with a hole for the escape of air, closed by a thumb-screw, K. I prefer to make the guide-rod I tubular in whole or in part to lessen its weight. The water is allowed free escape therefrom by suitable hole or holes. The guide-stem has upon it collars I$^2$ I$^3$.

L is a lever, which rocks on a fulcrum, M. N is a cage containing a ball, N', that plays from end to end of the cage, and tends by its weight to hold the lever in either position to which it may be moved by the action of the float upon it. One end of the lever L has a fork, L', that embraces loosely the stem I of the float and the stem O of a balanced steam-valve. The collars I$^2$ I$^3$ are by the vertical movements of the float brought in contact with the fork L' to raise and depress that end of the lever and simultaneously to depress and raise the other end of the lever, which operates another normally-open valve. The first-named stem O of the steam-valve has upon it collars O' O$^2$, against which the fork L' comes in contact to open and close the valve. The valve is of common construction, being a compound puppet-valve, P P, whose seats are respectively above and below the steam-passage Q, said passage being in communication with the steam-space of the steam-boiler. As the water accumulates in the trap and the float rises the collar I$^2$ comes in contact with the fork L' and lifts the lever L into the position shown in Fig. 3. As the fork rises it comes in contact with the collar O' and lifts the valve P P from the seats, and the steam fills the trap and raises the pressure within the trap to an equality with the pressure within the boiler. The water within the trap is then carried by gravity into the boiler. As the float descends the lever L is kept in the same position by the weight N' until the collar I$^3$ comes in contact with the fork L', when that end of the lever is carried downward, closing the valve P P, and causing the ball N' to run to the other end of the cage into the position shown in Fig. 1, and the valve P P remains closed until the upward movement of the float again brings the collar I$^2$ in contact with the fork L'.

R is the stem of the normally-open balanced steam-valve, having two puppet-valves, S S, fast upon the stem, whose ports discharge, respectively, into the top and bottom of the discharge pipe or passage U, leading from the valve-case T to the outer air.

V is a safety-valve in the pipe U, and W is a spring pressing the safety-valve down upon its seat.

X is a steam-whistle at the outer end of the pipe U, which serves to indicate the passage of steam through the valves. The valve-stem R extends down into the chamber of the trap, and is loosely embraced by the forked end $L^2$ of the lever L.

Upon the stem R are two collars, $R'$ $R^2$, against which the fork $L^2$ acts to close and open the valve as the lever oscillates upon its fulcrum. That movement of the lever L which opens the steam-valve closes the normally-open steam-valve, and vice versa. Thus the normally-open steam-valve is open when the trap is receiving water and closed when full steam-pressure is within the trap.

The pipes D, F, and Q are provided with suitable stop cocks or valves.

I claim as my invention—

1. The combination of a float having a vertical stem, to which it is rigidly secured, a steam-valve having a stem, normally-open valve having a stem, and a lever engaged by the float-stem and connecting with the steam-valve stem and normally-open valve-stem to open the steam-valve and close the normally-open valve, or vice versa.

2. A lever engaging the stem of a steam-valve at one side of the fulcrum and engaging the stem of normally-open valve on the other side of the fulcrum, and having a cage extending past the fulcrum in both directions and containing a ball having longitudinal movement in the cage, for the purpose set forth.

3. The combination of a chamber, a balanced normally-open valve, a pipe leading from the normally-open valve, and a safety-valve in the pipe, as set forth.

4. The combination of a chamber, a balanced normally-open valve, a pipe leading from the normally-open valve, a safety-valve in the pipe, and a whistle connected to the pipe, as set forth.

5. The combination of a chamber, a normally-closed steam-valve, a balanced normally-open valve, a lever governing the valves, and a float to actuate the lever, as set forth.

JAMES McGWIN.

Witnesses:
  CHAS. W. SAMUEL,
  J. RAY. SAMUEL.